Oct. 19, 1954   L. R. BUCKENDALE   2,692,028
BRAKE MECHANISM ADJUSTMENT
Filed July 9, 1948   3 Sheets-Sheet 1
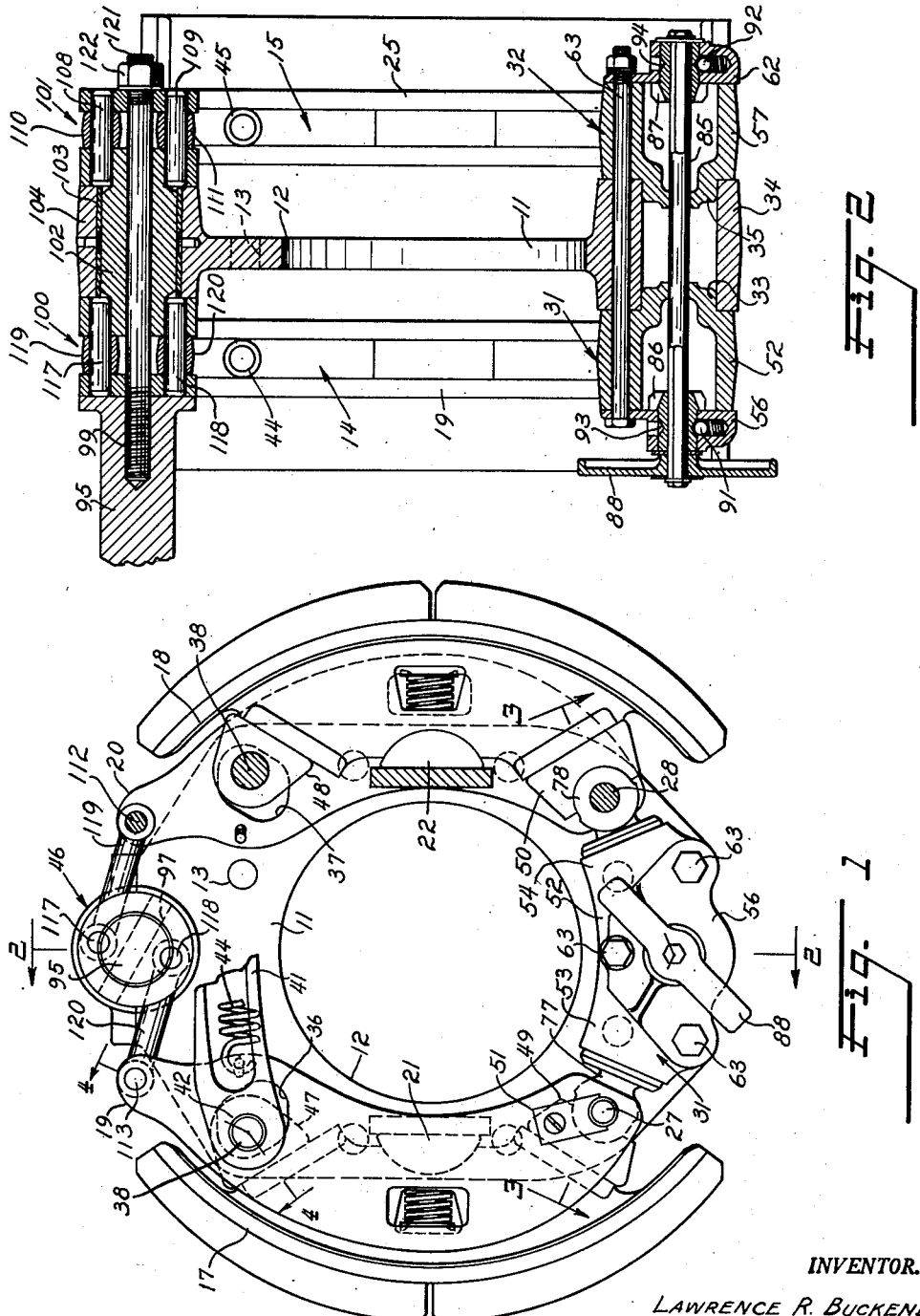
INVENTOR.
LAWRENCE R. BUCKENDALE
BY
Strauch & Hoffman
ATTORNEYS

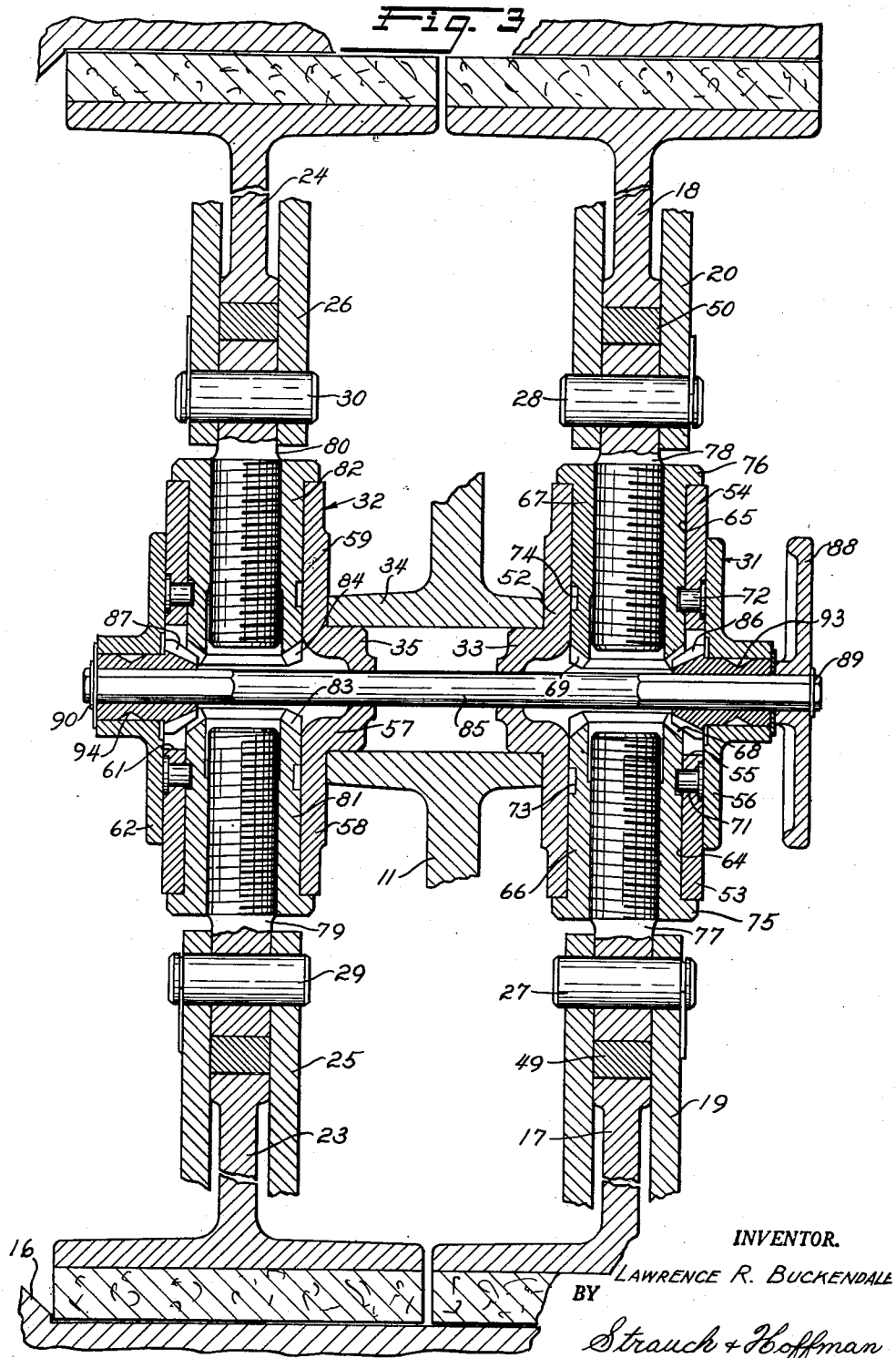

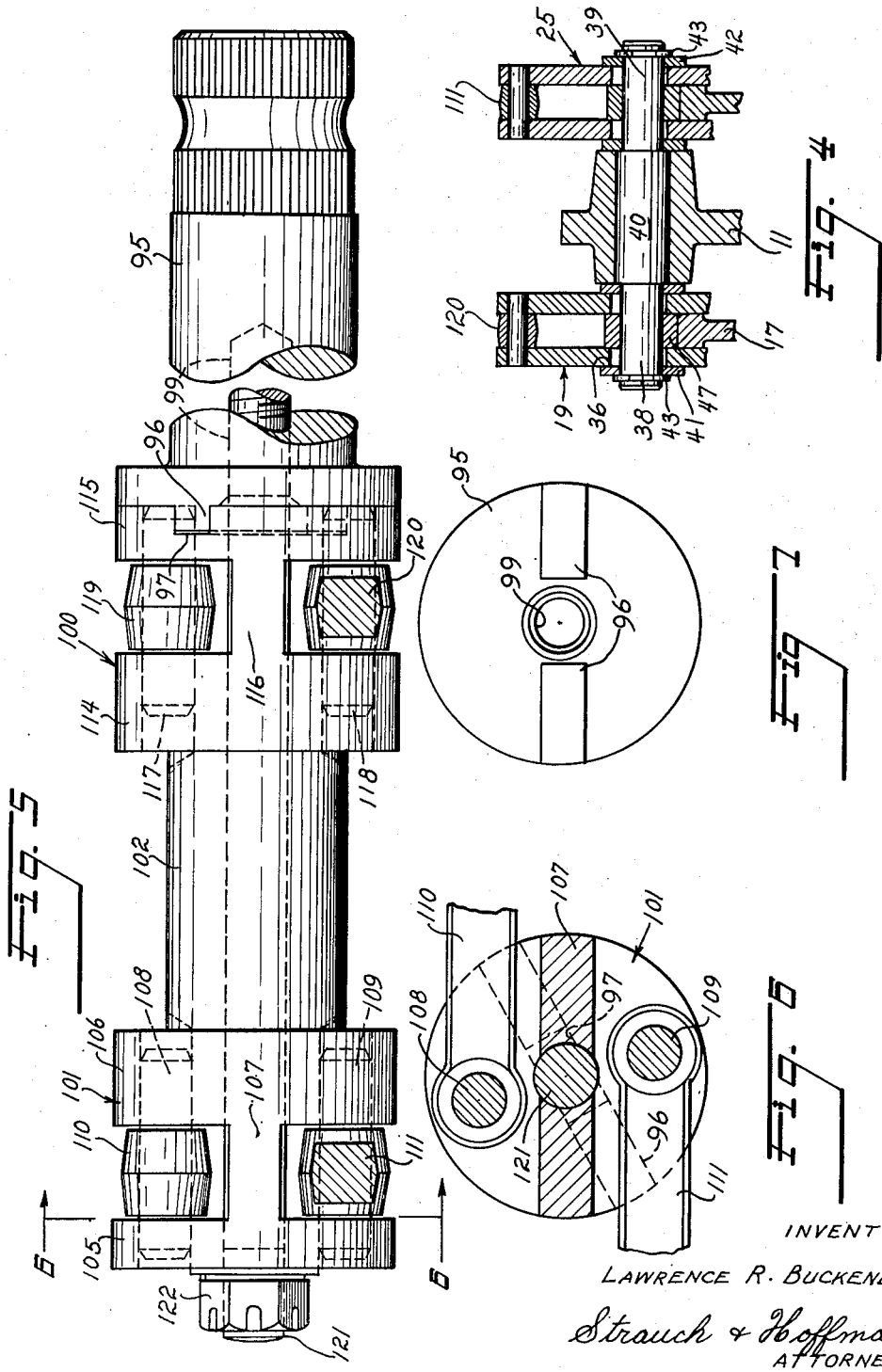

Patented Oct. 19, 1954

2,692,028

UNITED STATES PATENT OFFICE 2,692,028

BRAKE MECHANISM ADJUSTMENT

Lawrence R. Buckendale, Detroit, Mich., assignor, by mesne assignments, to Rockwell Spring and Axle Company, Coraopolis, Pa., a corporation of Pennsylvania Application July 9, 1948, Serial No. 37,761

6 Claims. (Cl. 188—79.5)

This invention relates generally to brake mechanisms wherein the brake shoes are mounted side by side within the same drum, and more specifically to a single point adjusting means whereby such side by side brake shoes may be simultaneously adjusted for installation and wear.

My co-pending application Serial No. 587,324, filed April 9, 1945, entitled Brake Mechanism, which has matured into United States Letters Patent No. 2,527,528 granted October 31, 1950, discloses a side by side brake shoe and drum assembly of this type wherein separate adjustments are provided for the individual brake shoes. The present invention accomplishes all brake shoe adjustment from a single station and embodies novel brake actuating and adjustment structure.

It is therefore the major object of the present invention to provide a novel brake mechanism comprising brake shoes mounted side by side within a common brake drum and an adjusting means associated with the brake shoes for simultaneously adjusting all the shoes substantially an equal amount with respect to the drum so that equalized lining wear will be assured. Preferably this adjusting means has an external operating head readily available at all times.

It is a further object of this invention to provide a brake mechanism having two pairs of diametrically opposed brake shoes mounted side by side within a brake drum and a novel adjustment associated with both pairs of brake shoes whereby all of the shoes may be adjusted simultaneously an equal amount with respect to the drum.

Another object of this invention is to provide novel brake mechanism having a foundation plate with a brake shoe assembly mounted on each side thereof, and a common adjustment associated with both brake shoe assemblies mounted on the foundation plate and having an operating head available externally of said mechanism.

Another object of this invention is to provide a brake mechanism comprising brake shoe assemblies mounted side by side and pivoted at adjacent ends, and a novel adjustment associated with the pivoted ends of these assemblies whereby the shoes may be simultaneously adjusted an equal amount.

It is a further object of the invention to provide a novel brake mechanism wherein two pairs of brake shoes pivot near adjacent ends on corresponding anchor pins, and a commond adjustment for all of these anchor pins.

A further object of the invention is to provide a novel actuating mechanism in a side by side brake assembly.

These and other objects will become apparent as the specification proceeds in connection with the appended claims and the annexed drawings, wherein:

Figure 1 is an end elevation, partly broken away and in section, of brake mechanism according to a preferred embodiment of the invention;

Figure 2 is a sectional view taken substantially along line 2—2 of Figure 1 and illustrates the side by side mounting of the brake shoes and details of the common adjustment;

Figure 3 is an enlarged sectional view taken along line 3—3 of Figure 1 illustrating the details of the common brake shoe adjustment;

Figure 4 is a section taken along line 4—4 of Figure 1 through an upper anchor pin assembly;

Figure 5 is an assembly view of the brake actuator cam device;

Figure 6 is a section substantially on line 6—6 in Figure 5; and

Figure 7 is an end view of the power shaft for the actuating cam.

The specification now continues with reference to the drawings wherein like reference numerals represent like parts throughout the several figures.

The brake mechanism of the invention comprises brake shoes and adjusting means therefor carried by a suitable foundation plate 11 provided with a large central opening 12 surrounded by rivet or bolt receiving holes 13, whereby the foundation plate may be rigidly secured to a suitable brake adapter flange on a conventional vehicle axle housing (not shown).

A pair of diametrically opposed brake shoe assemblies 14 and 15 are mounted, one on each side of foundation plate 11, within a common drum 16. Outer brake shoe assembly 14 comprises a pair of brake shoes 17 and 18 (Figures 1 and 3) rockably and slidably connected to brake actuating levers 19 and 20 through the fulcrum block and saddle bar assemblies indicated at 21 and 22. This rocking and sliding connection between the shoes and levers is preferably that disclosed in Alden et al. Patent No. 2,399,654, issued May 7, 1946, for Brake Mechanism, to which reference is made for further detail. The inner brake shoes 23 and 24 are similarly associated with brake actuating levers 25 and 26.

Levers 19 and 20 are pivoted at their lower ends on lower anchor pins 27 and 28, and levers 25 and 26 are similarly pivoted on lower anchor pins 29 and 30 that are coaxial with pins 27 and 28 respectively as illustrated in Figure 3. These lower anchor pin pairs 27, 28, 29 and 30 are mounted on adjustment brackets 31 and 32 respectively. As illustrated in Figure 3, bracket 31 is secured upon one side of plate 11 and has a projection 33 fitted into a hollow boss 34 in the lower part of the plate. Bracket 32 has a similar projection 35 fitted into the other end of boss 34 to locate it on plate 11.

At their upper ends levers 19 and 20 are formed with elongated apertures 36 and 37 that permit the necessary pivotal movement of these levers with respect to fixed upper anchor pins 38 rigid with plate 11. As illustrated in Figure 4, each upper anchor pin 38 comprises one projecting end of a stud 40 rigid with plate 11, and identical anchor pin 39 comprises the other end of each stud 40. A brace 41 (Figure 1) extends between the anchor pins 38 and a similar brace 42 extends between anchor pins 39. A suitable fastening clip 43 is provided on the outer end of each upper anchor pin.

The upper ends of levers 19 and 20 are connected by a tension spring 44 that normally urges the brakes into retracted position relatively to the drum. A similar spring 45 is provided between levers 25 and 26. Pivotal movement of the levers is effected by a cam head indicated at 46 in Figure 1 and later described in detail.

Upper anchor pins 38 provide journals rockably supporting abutment blocks 47 and 48 respectively, and associated lower abutment blocks 49 and 50 respectively are rockably mounted as will appear. Shoe 17 is formed at opposite ends with equally inclined angular faces slidably engaging blocks 47 and 49, and shoe 18 is formed at opposite ends with equally inclined angular faces slidably engaging blocks 48 and 50. Suitable external fastening devices 51 are provided on the levers to prevent axial displacement with respect to the lower anchor pins. The shoes of the inner brake assembly 15 are similarly associated with the levers and anchor pins. This manner of association of the levers, brake shoes, anchor pins and abutments, and the attendant operation, are disclosed in said Alden et al. Patent 2,399,654.

Referring now to the single point adjustment feature, outer bracket 31 comprises a housing 52 having opposite angularly extending hollow arms 53 and 54 and a front opening 55 closed by a removable cover 56. Inner bracket 32 comprises a housing 57 having similar oppositely extending arms 58 and 59 and a rear opening 61 closed by a cover 62. As illustrated best in Figures 1 and 2, the brackets 31 and 32 are secured upon plate 11, as by several through bolt and nut assemblies 63 that pass through cover 62, housing 57, boss 34, housing 52 and cover 56. With brackets 31 and 32 piloted in boss 34 by projection 33 and 35 that are preferably integral with their associated housings, bolt assemblies 63 are drawn tight to secure the covers on the bracket housings and secure the housings in tight assembly with the foundation plate.

Front housing 52 is provided in arms 53 and 54 with cylindrical bores 64 and 65 respectively. Sleeves 66 and 67 are journalled in bores 64 and 65 and provided with integral bevel gears 68 and 69 on their inner ends. Sleeves 66 and 67 are held against axial displacement by pins 71 and 72 fixed in arms 53 and 54 and projecting radially into annular grooves 73 and 74 in the sleeves. Sleeves 66 and 67 are also held against axial movement inwardly of housing 52 by outer flanges 75 and 76 at their outer ends bearing against the outer ends of the housing arms. Sleeves 66 and 67 are thereby held against axial movement but permitted to freely rotate.

Anchor pin supports 77 and 78, which look like eye bolts, have their shanks threadedly engaged with the internal threaded bores of sleeves 66 and 67. The cylindrical outer ends of supports 77 and 78 provide journals on which lower abutment blocks 49 and 50 are rockably mounted. Supports 77 and 78 are also apertured at their outer ends, which are straddled by the lower ends of the associated actuating levers, and anchor pins 27 and 28 are secured in these apertures. The threaded engagement of sleeves 66 and 67 with supports 77 and 78, together with the above described arrangement for holding the sleeves against axial movement, insures that rotation of the sleeves will result in axial displacement of the supports which cannot rotate about their axes due to their connection with the brake actuating levers, for a purpose to appear.

In a similar manner, rear housing 57 has mounted on it anchor pin supports 79 and 80 that have their threaded shanks engaged with the internally threaded bores of sleeves 81 and 82 which in turn are rotatable but not axially movable on the housing. Sleeves 81 and 82 are provided with integral gears 83 and 84 at their inner ends and are held against axial movement in the same manner as sleeves 66 and 67. The outer end of each support 79 and 80 is apertured for mounting the associated anchor pin, and formed for rockably supporting the associated abutment block.

A shaft 85, that is long enough to project through both brackets 31 and 32, is coaxial with boss 34 and may be intermediately rotatably supported by projections 33 and 35. Near opposite ends, shaft 85 has secured thereto for rotation therewith two oppositely facing bevel gears 86 and 87. The hubs of gears 86 and 87, as illustrated in Figure 3, are journalled in bosses on covers 56 and 62 respectively. Rotation of shaft 85 is effected by a handle or tool fitting member 88 that is available at the open end of the brake drum. Suitable fastening elements indicated at 89 and 90 prevent axial movement of shaft 85.

Gear 86 is meshed with both of gears 68 and 69, and gear 87 is meshed with both of gears 83 and 84. The threaded connections between the anchor pin supports and the sleeves in front housing 52 are of opposite hand to the threaded connections between the anchor pin supports and sleeves of rear housing 57. The threaded connections between the supports and sleeves in each housing are the same to provide opposite movement of each such support when shaft 85 is rotated.

This arrangement provides that, when shaft 85 is rotated in a given direction by turning handle 88, anchor pins 27 and 28 will be oppositely and equally displaced, and at the same time anchor pins 29 and 30 will be similarly oppositely and equally displaced, to thereby adjust both brake assemblies equally and simultaneously from a single point. The axes of rotation of each set of inclined sleeves 66, 67 and 81, 82 intersect each other upon the axis of rotation of shaft 85 in the assembly, and the axes of all the anchor pins remain parallel to shaft 85 and the axis of the vehicle axle during all conditions of adjustment.

Therefore, as the above described brake mechanism becomes worn, the pivoted ends of both brake assemblies may be simultaneously moved outwardly in the direction of the brake drum by rotation of handle 88 of the adjusting mechanism.

The front and rear covers 56 and 62 are provided with spring loaded balls 91 and 92 which engage one of a series of detents 93 and 94 in the surface of the hubs of gears 86 and 87 respectively thereby restraining rotation of the gear and shaft assembly and maintaining the adjustment.

The actuator for operating the brake assemblies about their lower anchor pin pivots is illustrated in Figures 1, 2, 5, 6 and 7. This comprises a power shaft 95 suitably journalled upon the upper end of plate 11 and is rotatably driven in either direction by a pneumatic motor or the like (not shown). The enlarged flange inner end of shaft 95 (Figure 7) is formed with a diametral rib 96 squared to interlock in drive relation with a diametral slot 97 in the adjacent end of cam head unit 46. A central threaded bore 99 is also formed in this end of shaft 95.

The cam head is preferably an integral part comprising two cam sections 100 and 101 associated with brake assemblies 14 and 15 respectively and disposed on opposite sides of an intermediate cylindrical portion 102 which is journalled on a bushing 103 lining a boss 104 in the upper central part of plate 11.

Cam section 101 comprises spaced flanges 105 and 106 connected by a flat central web 107. Spaced parallel pivot pins 108 and 109 bridge the flanges on opposite sides of the web, and oppositely extending links 110 and 111 are pivotally connected at opposite ends to pins 108, 109 and suitable studs on levers 25 and 26 respectively.

Cam section 100 comprises spaced flanges 114 and 115 connected by flat web 116 and pins 117 and 118 that bridge the flanges on opposite sides of the web. Oppositely extending links 119 and 120 are pivotally connected at opposite ends to pins 117 and 118 and studs 112 and 113 of the associated levers 19 and 20 of brake assembly 14.

Cam head 46 and shaft 95 are held in tight axial assembly by an elongated stud 121 that extends entirely through a suitable central bore in cam head 46 into threaded engagement with bore 95. A nut and washer assembly 122 threaded on the end of stud 121 draws the shaft and cam head together when tightened.

In operation, when shaft 95 is rotated, clockwise in Figure 1, the links spread both brake assemblies simultaneously into engagement with the brake drum.

I have thus provided a brake mechanism which is particularly useful for heavy duty vehicles with a sturdy simple efficient cam operation, and having all brake adjustment effected from a single station that is located at the open end of the drum for easy access.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a brake assembly having an axle housing and a brake drum mounted for rotation in surrounding relation upon said housing, a brake spider secured upon said housing within the drum, a pair of brake shoes at each side of said spider for coaction with said drum, each pair being mounted on pivots at adjacent ends on opposite sides of said spider, a common actuator for all of said shoes comprising a cam shaft journalled on said spider and spaced cams on said shaft one on each side of said spider and operatively connected between the ends of said pairs of shoes opposite said pivots, and a shiftable adjustment member mounted on said spider and having an actuating head accessible through the open end of said drum operably connected to each of said brake shoe pivots for simultaneously adjusting all of said pivots.

2. In a brake assembly, a support, a first bracket mounted on one side of said support, means for mounting a pair of brake shoe pivots on said bracket for substantially linear adjustment along angularly related paths, a second bracket mounted on the opposite side of said support, means for mounting a second pair of brake shoe pivots on the second bracket for substantially linear adjustment along angularly related paths, means extending between said brackets and operable from one side of said support connected to said mounting means for adjusting all of said pivots simultaneously and similarly, a pair of brake shoe assemblies on each side of said support having adjacent ends mounted on said pivots, and a common actuator for all of said brake shoe assemblies mounted on said supports substantially diametrically opposite said brackets.

3. In a brake assembly, a spider, a pair of lower brake shoe anchor pins adjustably mounted on each side of said spider with the corresponding pins of each pair in alignment, brake shoe assemblies comprising actuating levers pivoted on each lower anchor pin, an actuator device operably connected to the non-pivoted ends of said brake levers, a double ended upper anchor pin projecting oppositely into association with each of said brake levers, pivoted abutments on each of said upper and lower anchor pins, brake shoes slidably associated with said abutments and rockably and slidably connected to said brake levers, and means for simultaneously correspondingly adjusting all of said lower anchor pins.

4. In a brake assembly, an apertured support, hollow brackets mounted on opposite sides of said support, each of said brackets having an opening on the side opposite said support and a cover over said opening, a shaft extending through said aperture rotatably mounted at opposite ends in said covers and projecting externally of one of them, an operating handle on said projecting shaft end, angularly related arms on each of said brackets carrying pivots for the brake assemblies, and operating connections between said shaft and each said pivot for simultaneous adjustment of said pivots when said shaft is rotated by said handle.

5. In a brake assembly, a spider having diametrically opposite hollow bosses, brackets mounted on opposite ends of one boss and anchor pins on said brackets, a common adjustment for said anchor pins extending through said one boss, and an actuation device rotatably mounted in said other boss having means on opposite sides of said spider adapted for operative connection with the ends of brake levers pivoted on said anchor pins.

6. A cam head for a dual brake assembly wherein two pivoted brake shoe mounting lever pairs are mounted side by side comprising an intermediate journal section between two cam sections, each cam section comprising spaced flanges connected by integral webs, a pair of pins on opposite sides of the web and pivoted links connected to the adjacent ends of the brake levers.

References Cited in the file of this patent

UNITED STATES PATENTS

| Number | Name | Date |
|---|---|---|
| 1,078,600 | Marmon | Nov. 11, 1913 |
| 1,320,669 | Auger | Nov. 4, 1919 |
| 1,461,715 | White | July 10, 1923 |
| 1,939,601 | Spalding | Dec. 12, 1933 |
| 2,146,207 | Farkas | Feb. 7, 1939 |
| 2,202,454 | Kaufmann | May 28, 1940 |
| 2,366,946 | Whitacre | Jan. 9, 1945 |
| 2,435,955 | Buckendale et al. | Feb. 17, 1948 |
| 2,496,562 | Schnell | Feb. 7, 1950 |
| 2,508,194 | Schnell | May 16, 1950 |
| 2,527,528 | Buckendale | Oct. 31, 1950 |
| 2,560,551 | Buckendale | July 17, 1951 |

FOREIGN PATENTS

| Number | Country | Date |
|---|---|---|
| 469,911 | Great Britain | Aug. 5, 1937 |